Patented Apr. 25, 1950

2,505,682

UNITED STATES PATENT OFFICE 2,505,682

AMIDES OF α:β-UNSATURATED CARBOXYLIC ACIDS AND A PROCESS OF MAKING SAME

Henry Martin and Alfred Margot, Basel, Switzerland, assignors to J. R. Geigy A. G., Basel, Switzerland, a Swiss firm No Drawing. Application June 23, 1947, Serial No. 756,549. In Switzerland June 28, 1946

1 Claim. (Cl. 260—562)

1

The present invention relates to the manufacture of amides of α:β-unsaturated carboxylic acids of the general formula

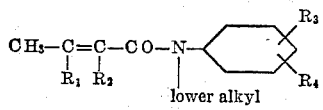

wherein $R_1$ and $R_2$ each stands for hydrogen or methyl, $R_3$ represents hydrogen, halogen, methyl or methoxy, and $R_4$ stands for halogen, methyl or methoxy, which amides are valuable fungicides and insect repellents.

The acids from which the aforesaid amides are derived are: crotonic acid, β:β-dimethyl-acrylic acid, α:β:β-trimethyl-acrylic acid and α-ethylidene-propionic acids.

The following are examples of N-alkyl-arylamines that can be employed as amine components: N-methyl-p-chloraniline, N-propyl-p-chloraniline, N-tertiary butyl-p-chloraniline, N-ethyl-o-chloraniline, N-iso-propyl-o-chloraniline, N-allyl-o-chloraniline, N-amyl-o-chloraniline, N-methyl-m-chloraniline, N-butene-2-yl-m-chloraniline, N-ethyl-3:4-dichloraniline, N-ethyl-2:4-dichloraniline, N-methyl-2:6-dichloraniline, N - ethyl - 2:5 - dichloraniline, N - propyl - 3:5 - dichloraniline and analogous bromine compounds; N-methyl-p-toluidine, N-ethyl-p-toluidine, N-isobutyl-p-toluidine, N-ethyl-o-toluidine, N-propyl-o-toluidine, N-isopropyl-o-toluidine, N-allyl-o-toluidine, N-amyl-o-toluidine, N-methyl-m-toluidine, N-ethyl-m-toluidine, N-propyl-m-toluidine, N-isobutyl-m-toluidine, as well as N-alkyl derivatives of the various xylidines and N-alkyl derivatives of the various chloro- and bromo-toluidines; N-ethyl-p-anisidine, N-methyl-o-anisidine, N-propyl-m-anisidine, N-allyl-3:4-dimethoxy-aniline, N-isopropyl-2:4-dimethoxy-aniline, N-ethyl-2-methoxy-4-toluidine, N-methyl-4-methoxy-3-chloraniline and the like.

Various methods known for the production of other amides may be employed with appropriately chosen starting materials, for the production of the amides defined by the general formula.

For instance, α:β-unsaturated carboxylic acids of Formula I

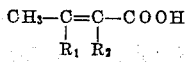

or their reactive functional derivatives, such as halides, anhydrides, esters, amides or salts, can be reacted (subjected to double decomposition) with N-alkyl-arylamines of Formula II

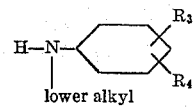

or their salts, metal compounds or reactive derivatives. This reaction takes place, in principle, in accordance with the following equation:

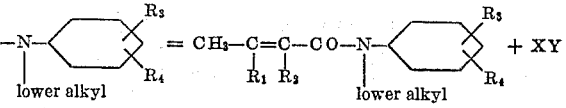

In the above formulae, $R_1$, $R_2$, $R_3$ and $R_4$ have the meaning defined above, whilst X and Y denote radicals which are split off in the reaction.

In the simplest case, the free acid is heated with the amine, water being split off (X=OH, Y=H, XY=H₂O). It is also possible for example to react an alkali salt of the acid with a salt of the amine by heating (e. g. X=ONa, Y=HCl.H; XY=NaCl+H₂O). Acid halides or anhydrides may be reacted with the amine (e. g., X=Cl, Y=H; XY=HCl), if required in the presence of acid-binding means, for which purpose the amine itself may be employed. Also, acid halides or anhydrides may be reacted with the metal compounds of the amines (e. g., X=Cl, Y=Na; XY=NaCl) or, in special cases, acid halides may be reacted with hydrohalides of the amines (e. g., X=Cl, Y=HCl.H; XY=2HCl). Esters react with the amines by splitting off alcohols (e. g., X=OCH₃, Y=H; XY=HOCH₃) and, finally, amides likewise react with the N-alkyl-arylamines or their salts, with splitting off of ammonia or ammonium salts (e. g., X=NH₂, Y=H; XY=NH₃).

The processes of condensation involving the splitting off of hydrohalogen such as for example the reaction of acid halides with secondary amines mostly lead to halogen-containing final products, which have to to be made halogen-free by further purification.

A preferred modification, which also takes place in accordance with the above equation and which leads to halogen-free final products with a specially good yield, is the reaction (double decomposition) of salts of the acids with reactive carbamic acid derivatives which are derived from the amines defined above. For example, carbamic acid halides, which can be regarded as chloroformic-acid derivatives of N-alkyl-arylamines, may be reacted with alkali salts of α:β-unsaturated acids by heating to form the desired amides with the splitting off of carbon dioxide and alkali halide (e. g., X=ONa, Y=Cl—CO—; XY=NaCl+CO₂).

No claim is made to completeness in the enumeration of these modifications. The reactions (or double decompositions) may, moreover, be effected by the methods described in technical literature (cf. Weygand: Organisch-chemische Experimentier-kunst, page 381).

Instead of starting from α:β-unsaturated carboxylic acids of the formula

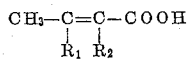

it is possible to start from for example corresponding suitably substituted saturated acids which can be used for the production of the α:β-unsaturated acids, to convert these, for example analogously to the manner explained, into the acid amides and then to form the double bond by the methods which are customary for the production of α:β-unsaturated acids (cf. Weygand, page 416). This process can be illustrated, in principle, by the following equation:

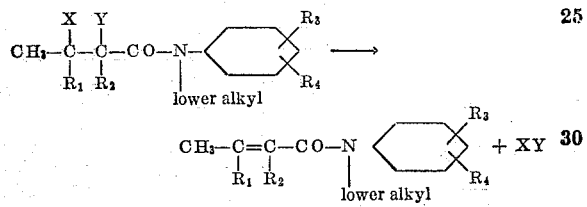

In this equation, R₁, R₂, R₃ and R₄ have the meaning defined above, whilst X and Y denote radicals which are split off together as XY in the reaction.

This process will be explained by, for example, the following possibilities:

(a) Splitting off of water from corresponding α- or β-hydroxyacid amides, in the first case X denoting H and Y denoting OH and in the second case X denoting OH and Y denoting H. The splitting off of water can be effected by heating, if required in the presence of catalysts such as iodine or of dehydrating agents such as sulphuric acid, sodium bisulphate, oxalic acid, phosphorus halides, zinc chloride or such like. Readily obtainable β-hydroxyacid derivatives are especially suitable for this purpose. For example, β-hydroxy-isovalerianic acid-N-methyl-o-chloranilide can be converted into β:β-dimethylacrylic-acid-N-methyl-o-chloranilide by heating with agents which split off water.

(b) The hydroxyl group of the hydroxyacid amides may also be esterified with an acid. In this case the formation of the double bond can be effected by splitting off a molecule of acid, either by heating or by treatment with an acid-binding agent. Thus, for example, benzoic acid is split off from β-benzoyl-hydroxy-butyric-acid-N-methyl-o-chloranilide by heating, with the formation of crotonic-acid-N-methyl-o-chloranilide. In this case, X=OCOC₆H₅ and Y=H.

(c) The splitting off of hydrogen halide from corresponding α- or β-halogen-acid amides (e. g., X=H or Cl; Y=Cl or H) is quite analogous to the above mentioned splitting off of water from α- or β-hydroxy acid amides. The splitting off of hydrogen halide is mostly carried out by treatment with acid-binding agents such as alkalis or tertiary amines, for example dimethyl-aniline or quinoline. The splitting off of hydrogen halide from α-halogen-acid amides is especially suitable, because these α-halogen-acid derivatives are readily available. Thus, for example, α-bromobutyric acid bromide is reacted with N-methyl-o-toluidine in the cold to form α-bromobutyric-acid-N-methyl-o-toluidide, which is converted into crotonic-acid-N-methyl-o-toluidide by heating with dimethylaniline.

(d) There may also be mentioned the splitting off of halogen from α:β-dihalogen-acid amides, which is effected by heating with metals such as zinc or coppered zinc (X and Y=halogen). Thus, for example, α:β-dibrom-α:β:β-trimethylpropionic acid can be converted into N-ethyl-p-anisidide through the acid bromide, from which the bromine is split off by heating with zinc dust in xylene. α:β:β-Trimethylacrylic-acid-N-ethyl-p-anisidide is obtained in this manner, whilst the bromine which is split off is converted with the zinc into zinc bromide.

In order to produce amides of α:β-unsaturated carboxylic acids of the formula

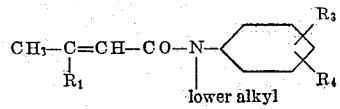

wherein R₁, R₃ and R₄ comply with the definitions given above, it is possible to start from amides of the formula

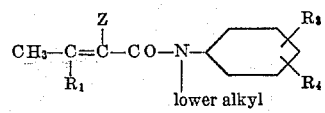

wherein Z denotes a group which is replaceable by hydrogen, and to replace in this the group Z by hydrogen.

The group Z may, for example, be a carboxyl group which, on heating, is readily split off in the form of carbon dioxide. Starting materials of this kind can be prepared, for example, by reaction of amines of the Formula II with alkylidene-malonic acid derivatives of the formula

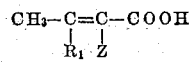

wherein R₁ is defined as above and Z denotes a carboxyl group or a radical which is convertible by saponification into the carboxyl group, such as the carbalkoxy or the -CN-group, or by reaction with reactive derivatives of such acids. The radical Z is then converted by saponification into the carboxyl group and the latter is simultaneously or subsequently split off.

For example, isopropylidene-malonic acid-ester-chloride is reacted with an N-alkyl-arylamine of the Formula II to form isopropylidene-malonic-acid-ester-N-alkyl-arylide. In the latter, the ester group can be saponified to the free carboxyl group by means of hydrolysing agents. On being heated the isopropylidene-malonic-acid-mono-N-alkyl-arylide splits off carbon dioxide, the corresponding β:β-dimethyl-acrylic-acid-N-alkyl-arylide being produced.

The group Z may also be an acetyl group. Amides of the formula

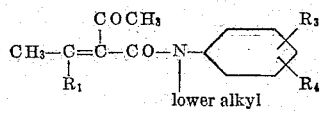

which may be obtained from, for example, alkylidene-aceto-acetic esters and N-alkyl-arylamines, give the desired arylides on hydrolysis.

It is also possible to produce amides of the formula

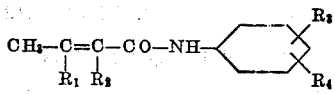

wherein $R_1$, $R_2$, $R_3$ and $R_4$ comply with the definition given above, for example analogously to one of the methods described and explained above, whereupon the amides can be alkylated at the nitrogen atom.

The known methods may be used for the alkylation; for example, dialkyl sulphates, alkyl halides or alkyl esters of arylsulphonic acids may be employed (cf., for example, Titherley, J. Chem. Soc. London, vol. 79 (1901), page 391).

In the following examples, which serve to illustrate the process generally described above, "parts" always denote "parts by weight." Parts by weight bear the same relation to parts by volume as do grams to cubic centimeters.

Example 1

10.5 parts of crotonyl chloride are dropped in such a manner into 27 parts of N-ethyl-o-toluidine, while stirring, that the temperature rises to 130–140° C. After cooling, the reaction product is dissolved in ether or other solvent that is immiscible with water, and the solution is washed successively with hydrochloric acid, alkali solution and water. After distilling off the solvent, the residue is distilled in vacuo. The crotonic-acid-N-ethyl-o-toluidide boils at 153–155° C. at a pressure of 13 mm. and is a slightly yellowish oil.

Instead of carrying the reaction out in the presence of an excess of N-ethyl-o-toluidine, it may be carried out in the presence of an acid-binding agent, for example potash, advantageously in a solvent (e. g., acetone).

Example 2

The dry sodium salt of dimethylacrylic acid is heated at about 180° C. with the calculated quantity of chloroformic-acid-N-methyl-o-toluidine in a voluminous flask until the evolution of carbon dioxide, which takes place with considerable frothing, has ceased. The whole is cooled to about 100° C., hot water is added and the whole is boiled for a short time. After cooling, the product is extracted with ether and the solution is washed successively with dilute acid, water, dilute alkali solution and then again with water. After drying with sodium sulphate, the ether is distilled off. The dimethylacrylic-acid-N-methyl-o-toluidide, which is obtained as the residue, is then purified by being distilled in vacuo. It boils at 145–150° C., at a pressure of 12 mm.

Example 3

14.6 parts of β-hydroxy-isovaleric-acid-ethyl ester are heated at about 160° C. with 14.2 parts of N-methyl-o-chloraniline until the splitting off of alcohol has been completed. After cooling, sodium hydrogen sulphate is added, the whole is heated for a short time at 190–200° C. and the dimethylacrylic-acid - N - methyl-o-chloranilide which is formed is distilled in vacuo. It boils at 168–172° C. at a pressure of 13 mm. and is a yellowish oil.

Example 4

17.7 parts of ethylidene-malonic-acid-mono-ethylester-chloride, which is produced by the usual methods, are added slowly to an ethereal solution of 27 parts of N-ethyl-m-toluidine. In order to complete the reaction, the whole is heated for some time to boiling under the reflux condenser. The ethereal solution is then washed with dilute hydrochloric acid and water. The residue which remains on distilling the ethereal solution is saponified by heating with soda solution. The solution is then carefully acidified and extracted with ether. The residue left on evaporation of the ethereal solution is heated at 200° C. until the evolution of carbon dioxide ceases. The resulting crotonic-acid-N-ethyl-m-toluidide boils at 157–160° C. at a pressure of 11 mm. and is a yellow oil.

Example 5

19 parts of dimethylacrylic-acid-p-toluidide in 30 parts by volume of absolute toluene are treated with 4 parts of sodium amide, which has been finely pulverised under toluene, and the whole is heated while stirring until no more ammonia is evolved. The sodium salt of dimethylacrylic-acid-p-toluidide separates as a jelly. At 50–60° C., 13 parts of dimethyl sulphate are run in and the whole is heated to boiling for 10 hours under a reflux condenser. It is then diluted with water, the layers are separated in a separating funnel and the toluene solution is washed successively with dilute alkali solution, acid and water. After distilling off the toluene, the dimethylacrylic-acid - N - methyl - p - toluidide passes over at 152–155° C. and at a pressure of 12 mm. as a slightly yellow-coloured oil.

In addition, by the processes described in accordance with the invention, it is possible to produce, for example, the following compounds to which, however, the invention is not limited:

| | Boiling point | Pressure |
|---|---|---|
| | °C | Mm. |
| Crotonic acid-N-methyl-o-chloranilide | 169–173 | 13 |
| crotonic acid-N-ethyl-p-toluidide | 159–163 | 11 |
| crotonic acid-N-methyl-o-toluidide | 144–148 | 13 |
| crotonic acid-N-methyl-p-toluidide | 153–158 | 12 |
| β:β-dimethyl-acrylic acid-N-ethyl-o-toluidide | 150–152 | 13 |
| β:β-dimethyl-acrylic acid-N-ethyl-p-toluidide | 160–163 | 11 |
| β:β-dimethyl-acrylic acid-N-ethyl-m-toluidide | 155–158 | 11 |
| trimethyl-acrylic acid-N-methyl-o-toluidide | 148–150 | 12 |
| trimethyl-acrylic acid-N-methyl-p-toluidide | 153–157 | 12 |
| trimethyl-acrylic acid-N-ethyl-o-toluidide | 152–156 | 12 |
| trimethyl-acrylic acid-N-ethyl-m-toluidide | 153–157 | 12 |
| β:β-dimethyl-acrylic acid-N-isopropyl-o-toluidide | 116–119 | 0.4 |
| crotonic acid-N-isopropyl-o-toluidide | 150–152 | 11 |
| crotonic acid-N-ethyl-p-bromanilide | 127–130 | 0.1 |
| crotonic acid-N-ethyl-3:4-dichloranilide | 138–141 | 0.1 |
| crotonic acid-N-ethyl-2-chloro-6-methylanilide | 118–121 | 0.05 |
| crotonic acid-N-methyl-p-anisidide | 135–140 | 0.1 |
| crotonic acid-N-ethyl-o-anisidide | 133–138 | 0.15 |
| crotonic acid-N-ethyl-p-phenetidide | 143–147 | 0.1 |
| crotonic acid-N-isoamyl-o-toluidide | 134–138 | 0.1 |
| β:β-dimethyl-acrylic acid-N-isoamyl-o-toluidide | 126–129 | 0.2 |
| β:β-dimethyl-acrylic acid-N-ethyl-p-bromanilide | 121–126 | 0.1 |
| β:β-dimethyl-acrylic acid-N-ethyl-m-chloranilide | 114–116 | 0.05 |
| β:β-dimethyl-acrylic acid-N-ethyl-3:4-dichloranilide | 123–126 | 0.05 |
| β:β-dimethyl-acrylic acid-N-ethyl-2-chlor-6-methyl-anilide | 117–118 | 0.05 |
| β:β-dimethyl-acrylic acid-N-ethyl-o-anisidide | 126–130 | 0.2 |
| β:β-dimethyl-acrylic acid-N-methyl-p-anisidide | 134–138 | 0.1 |
| β:β-dimethyl-acrylic acid-N-ethyl-p-phenetidide | 143–148 | 0.2 |
| trimethyl-acrylic acid-N-ethyl-m-chloranilide | 121–125 | 0.05 |
| trimethyl-acrylic acid-N-ethyl-p-bromanilide | 121–126 | 0.1 |
| trimethyl-acrylic acid-N-ethyl-o-anisidide | 168–174 | 11 |
| trimethyl-acrylic acid-N-methyl-p-anisidide | 130–135 | 0.1 |
| trimethyl-acrylic acid-N-ethyl-p-phenetidide | 139–143 | 0.1 |

What we claim is:

Process for the manufacture of an amide of an $\alpha:\beta$-unsaturated carboxylic acid corresponding to the formula

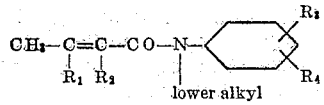

wherein $R_1$ and $R_2$ mean a member selected from the group consisting of hydrogen and methyl, $R_3$ means a member selected from the group consisting of hydrogen, halogen, methyl and methoxy, and $R_4$ means a member selected from the group consisting of halogen, methyl and methoxy, comprising reacting an alkali salt of the formula

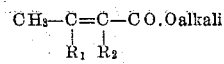

at a temperature ranging between 100° C. and 200° C. with a carbamic acid halide of the formula

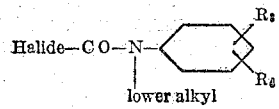

wherein $R_1$, $R_2$, $R_3$ and $R_4$ have the above defined meanings.

HENRY MARTIN.
ALFRED MARGOT.

REFERENCES CITED

The following references are of record in the file of this patent:

UNITED STATES PATENTS

| Number | Name | Date |
|---|---|---|
| 2,109,941 | D'Alelio | Mar. 1, 1938 |
| 2,339,672 | Biggs | Jan. 18, 1944 |
| 2,368,195 | Britton et al. | Jan. 30, 1945 |

OTHER REFERENCES

Bischoff: "Ber. Deut. Chem.," vol. 34 (1901), pp. 2127, 2129, 2130, 2132, 2133, 2134.

Fichter et al.: "J. Prak. Chem.," series 2, vol. 74 (1906), pp. 318, 325.

Degering: "An Outline of Organic Nitrogen Compounds," (1944), p. 400.